L. S. CHICHESTER.
DEVICE FOR AND METHOD OF COOKING CEREALS.

No. 192,362. Patented June 26, 1877.

Witnesses
Chas. H. Smith
Harold Serrell

Inventor
Lewis S. Chichester
per Lemuel W. Serrell
atty

UNITED STATES PATENT OFFICE.

LEWIS S. CHICHESTER, OF NEW YORK, N. Y.

IMPROVEMENT IN DEVICES FOR AND METHODS OF COOKING CEREALS.

Specification forming part of Letters Patent No. 192,362, dated June 26, 1877; application filed April 20, 1877.

*To all whom it may concern:*

Be it known that I, LEWIS S. CHICHESTER, of the city and State of New York, have invented an Improvement in Cooking and Desiccating Cereals, of which the following is a specification:

This invention is for cooking cereals previous to placing them on the market for sale; and the same relates to a means for cooking the cereals and the process by which the cereals are prepared and cooked.

I make use of an air-tight vessel with a surrounding jacket and movable cover, and there are steam-pipes passing through the vessel, arranged in such a manner as to apply uniform heat to the cereals that are to be cooked, and an air-pump is employed to exhaust the chamber and facilitate the drying or desiccation of the cereals. The cracked or crushed cereals are mixed with a proper quantity of water and placed in shallow perforated pans or trays. These are packed into the chamber aforesaid. The heat cooks the material, and the heat and vacuum dry the material; but the flavor of the grain and its nutritive qualities are retained, and by regulating the heat of the chamber the component parts of the grain, such as starch, will be more or less changed without being burned or injured. The material is then taken out of the trays and put up for market in the form of cakes, or else ground or cracked to the required fineness.

In the manufacture of crackers, especially from oatmeal, difficulty arises in properly and thoroughly cooking the same without rendering them so hard as to be very objectionable. I avoid this difficulty by the cooking and grinding operation aforesaid, which produces an oatmeal that is cooked, after which the flour is mixed with sufficient water to be molded by pressure into crackers in any ordinary machine, and placed in the said pans and subjected to sufficient heat to dry and bake the crackers without rendering them hard or flinty.

Figure 2:
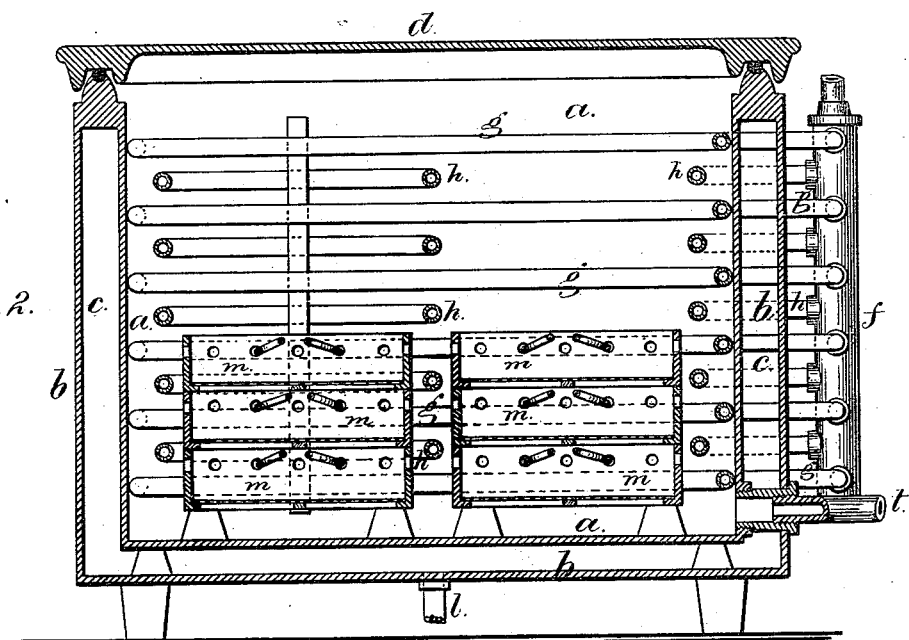
Figure 1:
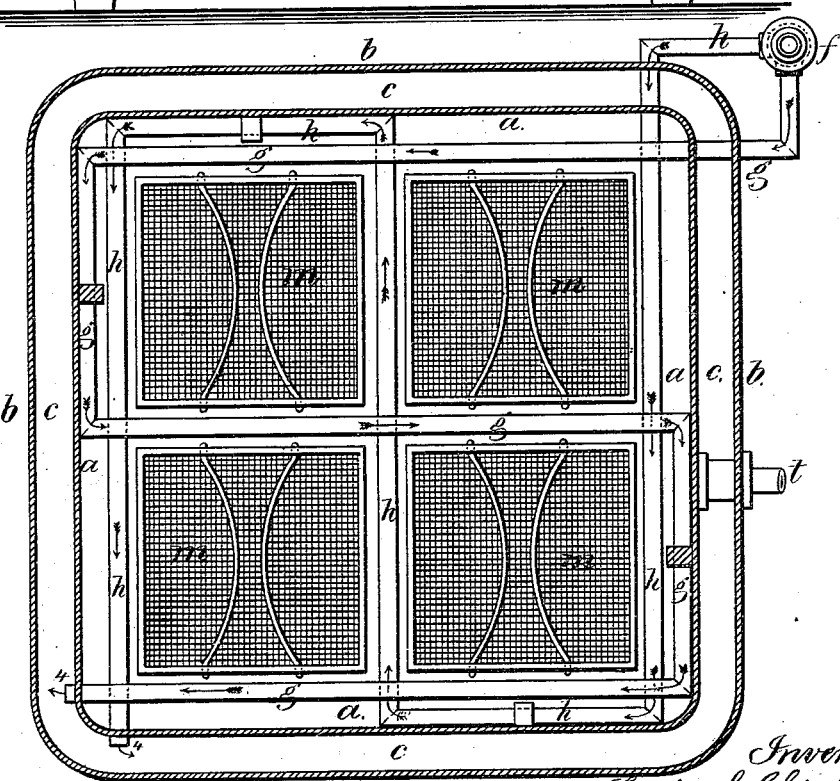

In the drawing, Figure 1 is a plan, partially in section, and Fig. 2 is a vertical section, of the apparatus made use of by me.

The vessel $a$ is of suitable size, and for convenience it is rectangular, and around the said vessel $a$ there is a jacket, $b$, that incloses the steam-space $c$. The jacket $b$ and vessel $a$ are united around the top edge, and a movable cover, $d$, is employed, that is made air-tight by a packing of suitable material introduced at the joint. The vertical steam-pipe $f$ connects with the horizontal ranges of pipes $g$ and $h$, that pass near the inner sides of the vessel $a$, and across the center portions thereof, the steam traveling in the direction of the arrows, and finally escaping, at the ends 4 of the pipes, into the steam-space around the vessel $a$. The water of condensation passes away by the pipe $l$. By this construction the entire chamber $a$ is heated to a high temperature, sufficient to cook the cereals without burning the same, the temperature being determined by the pressure of the steam.

The trays $m$ are made to set down between the pipes $g$ $h$, and each tray is made with a perforated bottom or wire-gauze, so that there is free opportunity for the vapors to pass off and the heat to circulate. These trays may also be subdivided by partitions into receptacles of suitable size.

When this apparatus is used for cooking crushed cereals the said cereals are mixed with the proper quantity of water and placed in the pans, and the pans are introduced within the apparatus and exposed to the proper degree of heat, and the cover, being placed upon the vessel $a$, retains the heat and causes the cooking operation to be uniform.

When the heat has been raised to the desired point an exhaust is applied to the vessel by an air-pump acting through the pipe $t$, so that the vapors are carried off rapidly, and the cooking and drying operation completed. The cereals are then removed in the cakes, and may be ground or crushed for market.

If desired, the cooked cereals may be sold in the form of cakes of any desired size, shape, or weight as they are removed from the trays, to be crushed, ground, or broken up when required for use. If these cereals are cooked at a temperature of less than 200° Fahrenheit, the starch and gluten are changed so as to be fit for food, and the blocks or cakes may be of a convenient size for handling, and they can be dissolved rapidly in boiling water, and used without further cooking.

In the manufacture of crackers the cereals, cooked and ground as aforesaid, are moistened with water and molded under heavy pressure, and cut into the proper shapes, and placed upon the trays, and put into the vessel $a$, and dried or cooked to whatever extent is desired. By this means the crackers are thoroughly cooked without being rendered hard or flinty, and they are more palatable and better adapted for food than the ordinary crackers.

I claim as my invention—

1. The vessel $a$, having a removable cover and a steam-jacket, in combination with the ranges of steam-pipes and the removable perforated trays, substantially as and for the purposes set forth.

2. The method herein specified of preparing cereals, consisting in moistening the crushed or ground cereal, spreading the same upon frames or trays, heating the same in a confined chamber or vessel to cook the cereals, drying the same by the action of the heat and a vacuum, and then removing such cereals from the trays, substantially as set forth.

Signed by me this 18th day of April, A. D. 1877.

LEWIS S. CHICHESTER.

Witnesses:
 GEO. T. PINCKNEY,
 GEO. D. WALKER.